US012554265B2

(12) United States Patent
Gordon et al.

(10) Patent No.: US 12,554,265 B2
(45) Date of Patent: Feb. 17, 2026

(54) HAZARD MITIGATION OF PACKAGE DELIVERY AREA

(71) Applicant: INTERNATIONAL BUSINESS MACHINES CORPORATION, Armonk, NY (US)

(72) Inventors: Michael S. Gordon, Chappaqua, NY (US); Matthew Beck, Danbury, CT (US); Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 665 days.

(21) Appl. No.: 17/829,406

(22) Filed: Jun. 1, 2022

(65) Prior Publication Data

US 2023/0393591 A1 Dec. 7, 2023

(51) Int. Cl.
*G05D 1/00* (2024.01)
*B64C 39/02* (2023.01)
(Continued)

(52) U.S. Cl.
CPC ........... *G05D 1/106* (2019.05); *B64C 39/024* (2013.01); *G06Q 10/0832* (2013.01);
(Continued)

(58) Field of Classification Search
CPC .... G06V 10/82; G06N 3/0475; G01S 7/4802; G05D 1/021; G05D 1/102; E01H 1/00;
(Continued)

(56) References Cited

U.S. PATENT DOCUMENTS 9,600,997 B1 * 3/2017 Abrahams ............. G08B 21/10
10,181,152 B1 1/2019 Rao
(Continued)

FOREIGN PATENT DOCUMENTS

CN 110182223 A * 8/2019 ............... B64F 1/00

OTHER PUBLICATIONS

"Amazon Prime Air", Amazon.com, downloaded from the Internet on Apr. 11, 2022, 4 pps., <https://www.amazon.com/Amazon-Prime-Air/b?ie=UTF8&node=8037720011>.
(Continued)

*Primary Examiner* — Yuri Kan
(74) *Attorney, Agent, or Firm* — Aaron N. Pontikos

(57) ABSTRACT

One or more processors receive data associated with delivery of a package to a delivery drop-off area. The data includes delivery history of the drop-off area, current and predicted weather conditions, customer profile data, and package content information. The one or more processors detect surface conditions of the delivery drop-off area. The one or more processors determine a hazardous condition for retrieval of a delivered package in the delivery drop-off area, based on the images and sensor data received from the delivery vehicle and processed by one or more machine learning models. The one or more processors perform actions to mitigate the hazardous condition at the delivery drop-off area, and the one or more processors provide a notification updating the hazardous condition in the delivery drop-off area and the at least one mitigating action taken.

16 Claims, 4 Drawing Sheets

(51) Int. Cl.
  *B64U 101/30*      (2023.01)
  *B64U 101/60*      (2023.01)
  *G06Q 10/083*      (2024.01)
  *G06Q 10/0832*     (2023.01)
  *G06V 10/82*       (2022.01)
  *G06V 20/17*       (2022.01)

(52) U.S. Cl.
  CPC ......... *G06Q 10/0838* (2013.01); *G06V 10/82* (2022.01); *G06V 20/17* (2022.01); *B64U 2101/30* (2023.01); *B64U 2101/60* (2023.01); *B64U 2201/10* (2023.01)

(58) Field of Classification Search
  CPC ...... G08G 5/76; G08G 5/32; G06Q 10/06315; G08B 21/10; B64F 1/00; A47G 29/14
  See application file for complete search history.

(56) References Cited

U.S. PATENT DOCUMENTS

| | | | | |
|---|---|---|---|---|
| 10,345,825 | B2 | 7/2019 | Erickson | |
| 10,380,694 | B1* | 8/2019 | Grant | G08G 5/32 |
| 11,854,415 | B1* | 12/2023 | Robertson | G08G 5/76 |
| 12,124,275 | B2* | 10/2024 | Suzuki | G05D 1/102 |
| 2011/0178635 | A1* | 7/2011 | Anderson | E01H 1/00 |
| | | | | 700/253 |
| 2016/0084986 | A1 | 3/2016 | Zach | |
| 2017/0090484 | A1 | 3/2017 | Obaidi | |
| 2017/0278406 | A1 | 9/2017 | Akselrod | |
| 2018/0029706 | A1 | 2/2018 | Baruch | |
| 2018/0130196 | A1 | 5/2018 | Loveland | |
| 2018/0137454 | A1* | 5/2018 | Kulkarni | G05D 1/021 |
| 2019/0114564 | A1* | 4/2019 | Ferguson | G06Q 10/06315 |
| 2019/0164441 | A1 | 5/2019 | Briggs | |
| 2020/0386892 | A1* | 12/2020 | Kotov | G01S 7/4802 |
| 2021/0065565 | A1 | 3/2021 | Dow | |
| 2023/0142863 | A1* | 5/2023 | Fan | G06N 3/0475 |
| | | | | 706/25 |

OTHER PUBLICATIONS

"Black Ice Detection Technology", Intelligent Vision Systems, 4 pps., downloaded from the Internet on Apr. 11, 2022, <https://www.intelligentvisionsys.com/technology/black-ice-detection-technology/>.

McNabb, Miriam, "UPS Drone Delivery: DroneUp Flies to Prove the Case for Coronavirus Response", drone life, 3 pps., Posted on Apr. 21, 2020, <https://dronelife.com/2020/04/21/ups-drone-delivery-droneup-partners-fly-to-prove-the-case-for-coronavirus-response/>.

Roberts, "Using UAV Based 3D Modelling to Provide Smart Monitoring of Road Pavement Conditions", Information 2020, 11(12), 568, Published: Dec. 4, 2020, <https://doi.org/10.3390/info11120568>.

* cited by examiner

HAZARD MITIGATION OF PACKAGE DELIVERY AREA

BACKGROUND

The present invention relates to unmanned delivery of items to a designated location, and more specifically, to mitigation/amelioration of potentially hazardous conditions at a designated delivery area.

Public preference for ordering items online and receiving delivery of the ordered items continues to increase over time. In some more-populated areas, delivery services have begun to use and rely on unmanned and autonomous delivery vehicles for the delivery of smaller item packages. Examples of unmanned and autonomous delivery vehicles include autonomous delivery robots (ADRs) and airborne drones.

Delivery of items provides a convenient service that many customers prefer and typically requires customers to retrieve the delivered item from a drop-off area or position external to, but in close proximity to the customer location.

SUMMARY

According to an embodiment of the present invention, a computer-implemented method, computer program product, and computer system is provided for mitigating hazardous conditions in a package delivery drop-off area. The method provides for one or more processors to receive data associated with delivery of a package to a delivery drop-off area, wherein the data includes package delivery history, current and predicted weather conditions, history of the delivery drop-off area, authorized customer profile data, and information regarding contents of the package for delivery. The one or more processors detect conditions of the surface of the delivery drop-off area, based on images and sensor data received from a delivery vehicle. The one or more processors determine whether a hazardous condition exists for customer retrieval of a delivered package in the delivery drop-off area, based on the images and the sensor data received from the delivery vehicle processed by one or more machine learning models assessing surface conditions encompassing the delivery drop-off area. The one or more processors perform at least one action to mitigate the hazardous condition determined to exist at the delivery drop-off area, and the one or more processors provide a notification of the hazardous condition in the delivery drop-off area, and the at least one mitigating action taken.

DETAILED DESCRIPTION

Figure 1:
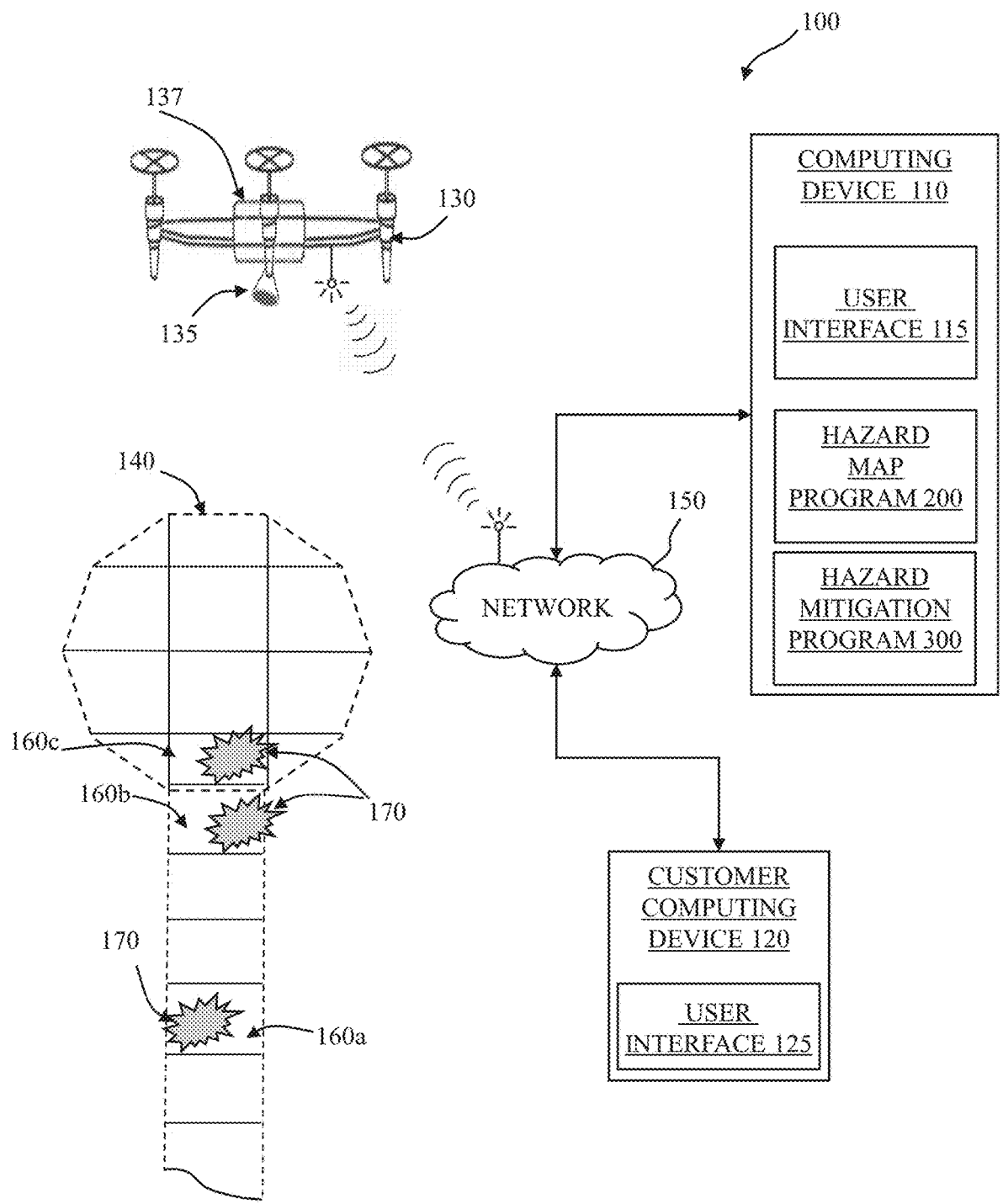
FIG. 1 is a functional block diagram illustrating a distributed data processing environment, in accordance with an embodiment of the present invention.

Embodiments of the present invention recognize that the Center for Disease Control and Prevention (CDC) approximates that one million Americans are injured annually as the result of falling on ice and/or snow, and for about 17,000 people, the injuries are fatal. A downside of package delivery, such as the delivery of items ordered online, often requires recipients to retrieve the delivered package at a drop-off point outdoors, which exposes the recipient (customer) to potential conditions that may result in injury. Conditions that may cause injury to customers retrieving delivered packages in drop-off areas include walkway surfaces, which may be covered with snow or ice. On some surfaces, standing water may cause slippery conditions, and anomalies to pathway surfaces may present tripping or injury hazards, such as holes, loose stones or walkway pavers, that may prove hazardous as well. In darkened areas, obstacles may be present but unseen due to poor lighting and present tripping hazards.

Embodiments also recognize the use of unmanned and autonomous vehicles to deliver packages to customers at a drop-off point in close proximity to the respective customer's location. The use of unmanned and autonomous vehicles for package delivery offers efficiencies for delivery services and effectiveness for customer recipients. Examples of unmanned and autonomous delivery vehicles include aerial delivery by drones and land-based delivery by autonomous delivery robots (ADRs). In some embodiments of the present invention, the unmanned vehicles may include remote control or remote intervention as necessary, whereas the autonomous vehicles perform delivery activities with self-contained control, without remote interventions.

Aspects of the invention include delivery drop-off areas (also referred to as "delivery areas"), in which packages are physically "dropped off" at a home or a business location. Delivery drop-off areas at a home typically include areas near or extending from an entrance to the home location, such as a front or side door entrance. A delivery drop-off area at a business location may be adjacent to or nearby a "receiving" door or entrance. A delivery drop-off area includes a drop-off point at which the package is placed within the delivery area, and the area immediately surrounding the drop-off point. The drop-off area also includes one or more pathways extending from a delivery location building entrance to the target point. In some embodiments, conditions may include snow or ice that has been moved aside or treated with melt-producing materials, however, nearby snow may have melted, flowed, and refrozen near or into the drop-off area, resulting in a slip or fall hazard. In other cases, objects or surface damage in the drop-off area may present a tripping hazard.

Increasing the use of unmanned and autonomous delivery vehicles also serves to improve safety and reduce the risk of injury to delivery personnel that typically need to navigate slippery walks and stairways, aggressive pets, poorly lit drop-off areas, and delivery site infrastructure fails, such as loose pathway bricks, broken or loose steps, and obstructing obstacles, for example. The safety improvement from the use of unmanned and autonomous delivery vehicles for delivery personnel doesn't address the potential of injury to customers retrieving delivered packages. Embodiments of the present invention provide a method, computer program product, and system for mitigation of hazardous conditions in a package drop-off area.

Embodiments of the present invention provide an assessment of surfaces associated with the package drop-off area to determine potential risks to customers retrieving delivered packages and perform mitigating actions to reduce the potential risks. Surface assessments rely on models that receive optical data of the drop-off area, and pathways to and from the point of package drop-off. Surface assessment models predict the surface conditions based on the received optical data as well as the time of day, current and predicted weather conditions for the immediate area, and history associated with the drop-off location. In some embodiments, the use of disclosed optical detection technology, utilizing infrared thermometry to produce radiance measurements at specific spectral bands, can detect water and ice on pathway surfaces and distinguish each from the other. The radiance measurements also detect the presence of black ice on surfaces, which isn't easily identified by eyesight alone and may present a high injury risk to customers using the pathway surface to retrieve a delivered package.

Aspects of the invention include models that utilize machine learning algorithms, which may provide real-time situational analytics of surface conditions at a delivery drop-off area. Detection by instrumentation on the delivery vehicle provides assessment data of the delivery drop-off area for existing standing water, snow, or ice by comparing photographic and thermal images to reference images of similar areas known to contain standing water, snow, or ice. The camera and sensor data input along with the current and forecasted weather conditions (i.e., determining whether the temperature is rising or falling, the presence of snow, ice, or rain currently or predicted), combine to predict the likelihood of slippery conditions at the package drop-off location and pathways from doors at a home or business.

In some embodiments, the surface assessment models are developed by the use of a convolutional neural network (CNN) and machine learning techniques for the recognition of objects embedded in images. A CNN can learn to recognize and distinguish a plurality of different objects in images (i.e., water, ice, snow, pathways) by utilization of a large number of images that either include or exclude the desired recognition objects, such as the use of the ImageNet data set (www.image-net.org). The ImageNet data set contains over one million training images covering a thousand different classifications from which the CNN can learn to identify and discern the differences in images between obstructions, pathways, water, snow, and ice. When properly trained, aspects of the invention that include the CNN, working together with the data stream that includes current and predicted weather conditions, assess the delivery drop-off area for hazards, and determine whether to perform mitigation actions during the delivery of the package and may determine the safest route for a customer to take to retrieve the package.

In one embodiment, aspects of the invention provide an assessment of the risk level associated with each segment of the delivery drop-off area and connecting pathways. Aspects of the invention use real-time situational awareness analytics to assess the drop-off area by segmenting the area and determining the risk level for each segment based on determining individual segment conditions. Segment risk level determines whether a safe passage exists for a customer to retrieve a package delivered to a point in the drop-off area, based on a data stream received that includes delivery vehicle camera and sensor data, satellite data, current and predicted weather conditions, and historical data regarding the delivery drop-off area.

In one embodiment, aspects of the invention provide a prediction of a specific time of day in which the customer will be retrieving the package from the delivery drop-off areas. In one aspect, a machine learning model can be trained to predict an approximate time of day that a customer retrieves the package, based on data from the customer's historical retrieval patterns, calendar data, and other data such as known physical condition and health condition of the customer. The risk level assessment and safest route determination methods take into consideration the predicted time of day in which the customer will be retrieving the package.

In one embodiment, aspects of the invention provide a hazard map of the delivery drop-off area, which includes pathways used to retrieve the delivered package and an area surrounding the drop-off point. The hazard map indicates hazard type and position within segments of the drop-off area. In some embodiments, the hazard map is delivered to a smart device of the customer to alert the customer of detected hazards, such as ice, snow, standing water, historically known slippery areas, and objects or obstructions in a pathway, and may indicate the position of detected hazards within segments of the drop-off area. In some embodiments, the hazard map may be used to indicate an alternative drop-off area that provides safer access and may be indicated by aspects of the invention or recommended by the customer. In one embodiment, aspects of the invention include a hazard map dashboard displaying alerts and indicating positions of detected hazards and estimated risk levels for each segment of the delivery drop-off area. In some embodiments, the hazard map dashboard may include an interactive user interface (UI) by which the customer can guide the delivery vehicle to deploy traction-improving materials in segments and at positions that pose current slippery hazardous conditions.

In another embodiment, aspects of the invention perform mitigating actions directed at the detected hazards by providing traction improving materials. For example, salt, sand, or other material may be deployed to the segments of the pathway and/or a drop-off area in response to the detection of snow or ice (including black ice detection). If required, aspects of the invention may contact and request additional traction material application from a secondary delivery vehicle, such as a drone associated with a drone delivery service (or other delivery vehicle type) that provides an initial deployment of traction improving materials or may be requested to provide additional traction materials as needed subsequent to deployment of traction material by the package delivery vehicle (e.g., drone 130, FIG. 1).

For example, a delivery drone may detect ice and snow on a pathway to the package delivery drop-off point and deploy traction-improving materials, such as sand and/or salt included in a payload section of the delivery drone. Aspects of the invention may determine that additional salt or ice-melt material may be needed to make the pathway safe for customer use. The aspects of the invention may contact an auxiliary delivery drone service, and a secondary drone arrives at the delivery drop-off area before the customer picks up the packages and deploys additional material that melts the snow and ice. In some embodiments, the delivery vehicle and/or a requested secondary vehicle may deploy water absorption material to mitigate a slip hazard posed by standing water. In another embodiment, the delivery vehicle uses thermal heating devices to melt a path that enables the recipient to safely retrieve the delivered package from the delivery drop-off area.

Other mitigating actions for the detected hazardous condition include, but are not limited to, recommendation of wearable items (i.e., type of shoe), predicted time of day of package retrieval, recommendation of an alternate person to retrieve the delivered package(s), deployment of a marker of obstacles or dangerous conditions (trip hazard), sending an alert and including a hazard map indicating the position of hazards within the segments of the delivery drop-off area, provide lighting in poorly lit areas, and alerting a remote virtual assistant to contact the customer. In some embodiments, a remote virtual assistant can be used to provide automated communication informing the customer of detected hazards the customer may encounter while retrieving a delivered package.

In some embodiments, the mitigation action to recommend an alternate person to retrieve the delivered package may be based on consideration and assessment of the level of risk for potential injury to the customer given consent to access profile information of the customer, and detected conditions in the delivery drop-off area. Aspects of the invention consider a customer's age, history of slips/falls or reported injuries suffered by other customers in similar neighborhoods along with consideration of the topology (e.g., paved surface, gravel path, steep incline, flat pathway, etc.) of the drop-off location and access pathway in estimating potential injury severity.

In an embodiment, the customer has consented to make certain profile information available such as age, physical condition, and health condition of the customer receiving delivery of a package. Aspects of the invention may estimate a high, medium, or low level of risk for potential injury to the customer, based on the detected conditions near the drop-off location and available profile information of the customer. In the embodiment, the consented profile information indicates whether the customer is elderly, has mobility challenges, and has a history of falls or other injuries. Aspects of the invention may recommend a designated alternate person perform the package pickup to avoid customer injury, or recommend an alternate, more convenient and safe drop-off point for the customer. Aspects of the invention may determine a lack of a safe drop-off point at the delivery location due to conditions and communicate with the customer as to whether delivery at an alternate time of the current day or an alternative day is acceptable. Aspects of the invention may deploy salt and/or sand on detected slippery surfaces and return at a later time once the slippery surface condition is improved by the deployment of salt and/or sand.

For example, combinations of customer profile information and delivery drop-off area detected conditions can be used to additively increase the estimated level of risk for injury to the customer. In the example, customer profile information and detected surface conditions at the delivery drop-off area can be considered as a binary evaluation of applicable conditions detected in the delivery drop-off area and the particular conditions associated with the customer from the customer profile information. The combinations of the presence or absence of the conditions (i.e., binary evaluation) are used to determine a "low", "medium", or "high" risk level of potential injury to the customer retrieving the delivered package.

For instance, a combination of customer profile information indicating a 35 year old customer without a history of falls or prior injuries and minor snow coverage of a portion of a segment adjacent to the pathway to the package drop-off point may produce a "low" risk level of injury for the customer. The "low" risk level results from a binary consideration of: age greater than 60 (no); history of falls/injuries (no); slippery conditions at drop-off area (yes); slippery conditions included in multiple segments of drop-off area (no); pathway to package includes slippery conditions (no). The combination of these items, whether present or not, can be associated with a risk level for potential injury to be low. Alternatively, a customer with age greater than 60 (yes); history of falls and injury (yes); multiple segments of the delivery drop-off area include slippery conditions (yes); and pathway to delivered package includes slippery conditions (yes), may result in a "high" risk level of potential injury to the customer.

In addition to the detection of surface conditions, such as ice, black ice, snow, and standing water, aspects of the invention include the detection of objects and other hazardous conditions (i.e., sharp objects, trip hazards, damage to pathway) in the drop-off area. Objects obstructing the pathway to the drop-off area or tripping conditions can be indicated within segments on the hazard map, which can include an alternate delivery drop-off point that may include input by the customer, if alternatives are available, and may be displayed on a customer smart device as a hazard dashboard associated with the delivery. Aspects of the invention may include deploying highly visible markers that depict an obstruction or tripping hazard condition within the drop-off area as a mitigation action, and for delivery under dark conditions, the marker may be illuminated, such as lighted or a glow-in-the-dark marker.

In one embodiment, aspects of the invention provide an alert to the intended recipient of the delivered package informing the recipient of detected hazards. The alert may be a short message service (SMS) communication, a pre-recorded audio call, or a video call between the customer and a remote virtual assistant, sharing images of potentially hazardous conditions for package pickup.

In another embodiment, a delivery vehicle, or an additional autonomous vehicle in communication with the delivery vehicle, provides lighting in dark or poorly lit delivery drop-off areas to illuminate the path between a home or business door and the delivered package, while the customer retrieves the delivered package, reducing the likelihood of the recipient slipping or tripping and falling while retrieving the delivered package. The delivery vehicle confirms the availability of the customer prior to illuminating the delivery drop-off area during the retrieval of the package by the customer. The delivery vehicle may use the predicted or designated time of day that the customer will likely retrieve the package from the drop-off area so that delivery can be synchronized.

In another embodiment, aspects of the invention determine, prior to initiating delivery, whether additional packaging or protection may be warranted (i.e., thermal insulation, water repellent, protective padding, etc.) given current and predicted future weather conditions, site history, current customer availability to immediately receive the package, and package contents (e.g., food, electronics, etc.). For example, if predicted weather at the drop-off area indicates rainy conditions, aspects of the invention may include additional waterproof packaging prior to initiating delivery. For other temperature-sensitive conditions, aspects of the invention may include additional insulation to protect the package contents, based on predicted temperatures in the path of delivery and the location of the drop-off areas. Further, should the package be insured or deemed valuable by the sender and/or carrier, that information, in combination with the predicted weather conditions, could be used in the decision to deploy package safeguards.

In one embodiment, aspects of the invention detect surface conditions of each segment of the delivery drop-off area and include the detected surface conditions along with the available customer profile information (e.g., age, physical condition, health condition, etc.), to determine an estimate of the level of risk of injury for the customer slipping and/or falling while on the way to pick up a delivered package, during the actual picking up of the delivered package, or on the way back from retrieving the package from the drop-off point.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110, customer computing device 120, and drone 130, all interconnected via network 150. Distributed data processing environment 100 also includes delivery drop-off area 140 which is depicted as divided into segments, and hazardous condition 170, which is depicted as occurring in segments 160a, 160b, and 160c of delivery drop area 140. Computing device 110 includes user interface 115, hazard map program 200, and hazard mitigation program 300. Customer computing device 120 includes user interface 125. Drone 130 is depicted as including camera 135, payload 137, and communicates by wireless connection via network 150.

Computing device 110, includes user interface 115, hazard map program 200, and hazard mitigation program 300. In some embodiments, computing device 110, can be a laptop computer, a desktop computer, a mobile computing device, a smartphone, a tablet computer, or other programmable electronic device or computing system capable of receiving, sending, and processing data. In other embodiments, computing device 110 may be a stand-alone computing device interacting with applications and services hosted and operating in a cloud computing environment. In still other embodiments, computing device 110 may be a blade server, a web-based server computer, or be included in a computing system utilizing clustered computers and components (e.g., database server computers, application server computers, etc.) that act as a single pool of seamless resources when accessed within distributed data processing environment 100. In yet other embodiments, computing device 110 can be a netbook computer, a personal digital assistant (PDA), or other programmable electronic devices capable of receiving data from and communicating with computing device 110. In some embodiments, computing device 110 remotely communicates with drone 130 and customer computing device 120 via network 150. In some embodiments, computing device 110 may be included in drone 130. Computing device 110 may include internal and external hardware components, depicted in more detail in FIG. 4.

User interface 115 provides an interface to access features and functions of computing device 110, including access to hazard map program 200 and hazard mitigation program 300. In some embodiments of the present invention, user interface 115 provides access for training and maintaining both hazard map program 200 and hazard mitigation program 300. User interface 115 also supports access to other applications, features, and functions of computing device 110. User interface 115 supports access to alerts, notifications, and other forms of communications. In one embodiment, user interface 115 may be a graphical user interface (GUI) or a web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also be mobile application software that provides an interface to features and functions of computing device 110. User interface 115 enables a user of computing device 110 to receive, view/hear, and respond to input, access applications, and perform functions available on computing device 110.

Customer computing device 120 receives a notification of package delivery and in some embodiments, receives a hazard map of the delivery drop-off area if one or more hazardous conditions are detected by and hazard map program 200 and input detection by camera 135 of drone 130. In some embodiments, the hazard map can be displayed on user interface 125 of customer computing device 120. In one embodiment, the hazard map is an interactive map on which the customer may indicate a preferred alternative drop-off area. Customer computing device 120 receives alerts and notifications from hazard map program 200 and hazard mitigation program 300. The alerts and notifications are displayed on user interface 125 of computing device 120 and include information regarding hazards detected in the delivery drop-off area, requests for the availability of the customer at a time of delivery, and notice of connection with a remote virtual assistant, for example. Customer computing device 120 may include internal and external hardware components, depicted in more detail in FIG. 4.

Hazard map program 200 receives input from delivery vehicle sensors, video stream images from camera 135, current weather conditions, predicted weather, time of day, and detects obstacles, obstructions, and surface anomalies associated with the delivery drop-off area. Hazard map program 200 determines potentially slippery conditions, such as detecting the presence and extent of ice, snow, or water and, from object recognition of received video images of the delivery drop-off area, detects whether obstacles, obstructions, or surface anomalies are present in the delivery drop-off area. Hazard map program 200 distinguishes the types of hazards using hybrid models that include a convolutional neural network and the use of infrared thermometry. Hazard map program 200 also considers consented-to profile information about the customer, such as age, physical condition, and health condition, to determine the risk level of detected hazards in the delivery drop-off area. Hazard map program 200 may determine the position of the detected hazards by segment of the delivery drop-off area and determines whether access to retrieve the delivered package includes likely encountering the detected hazards.

Hazard map program 200 generates a hazard map of the delivery drop-off area that identifies types of hazards and locates hazards in the delivery drop-off area by segment. In some embodiments, hazard map program 200 notifies the customer of a pending delivery and sends the hazard map of the delivery drop-off area to customer computing device 120 to be displayed on user interface 125 and also makes the hazard map available to a remote virtual assistant (not shown) as needed. In some embodiments, the hazard map generated by hazard map program 200 includes an interactive feature enabling the customer, using user interface 125 of customer computing device 120, to indicate an alternate drop-off point for package delivery which is received by hazard mitigation program 300 via drone 130.

Hazard mitigation program 300 receives weather information, history information, and customer availability associated with the delivery location prior to departure for delivery. Hazard mitigation program 300 provides instruction and receives confirmation of additional package protection and inclusion of hazard mitigation materials in a section of payload 137 of drone 130, based on the weather, history, package contents, and customer availability. Hazard mitigation program 300 receives the detected hazard information associated with the delivery drop-off area from hazard map program 200. Hazard mitigation program 300 locates the detected hazards and performs hazard mitigation actions at the delivery drop-off area and transmits an update of mitigation performed and hazard map information to the customer via hazard map program 200. In some embodiments, the hazard mitigation action includes deploying traction improving materials such as salt or sand to slippery hazard conditions in the delivery drop-off area. In other embodiments, the hazard mitigation action may be to deploy markers of obstacles or surface anomalies detected or illuminate a poorly lit delivery drop-off area. In some embodiments, hazard map program 200 and hazard mitigation program 300 may be modules of the same application program.

Drone 130 provides unmanned delivery of packages to customers at a designated delivery drop-off area 140. Drone 130 includes camera 135, which, in some embodiments, may be part of a set of sensors providing a stream of data input through drone 130 to hazard map program 200 and hazard mitigation program 300 of computing device 110. Drone 130 navigates to delivery locations by air travel using wireless navigation methods, such as the global positioning system (GPS). In some embodiments, navigation of drone 130 may be by a remote operator. In some embodiments, drone 130 can be an autonomous delivery robot (ADR) device that travels on land surfaces, such as sidewalks, and typically delivers packages in urban and dense suburban environments and may be autonomous or remotely controlled. Drone 130 is depicted as including camera 135 and payload 137.

Camera 135 provides a data stream of images of delivery drop-off area 140. In some embodiments, camera 135 is configured to include optical detection technology utilizing infrared thermometry to produce radiance measurements at specific spectral bands. The infrared thermometry technology enables camera 135 to provide radiance measurements to hazard map program 200 and hazard mitigation program 300 for detection of black ice on surfaces. Camera 135 also provides images of snow accumulation, rainy conditions, standing water, obstacles, obstructions, and surface conditions (i.e., holes, loose stones, paver bricks, etc.).

Drone 130 includes payload 137 enabling drone 130 to transport and deliver a package to delivery drop-off area 140. In some embodiments, payload 137 includes a separate capacity for carrying materials to deploy for mitigation of certain detected hazardous conditions at delivery drop-off area 140. In some embodiments, payload 137 includes ice-melting material, such as salt, or traction improving materials, such as sand. In some embodiments, payload 137 includes markers having high-visibility colors, and patterns, and may include ribbons or flags to increase recognition, which can be used to identify and draw attention to hazards in delivery drop-off area 140 that a customer may encounter while retrieving a delivered package. In other embodiments, payload 137 may be equipped with illumination devices that can be deployed to improve lighting in delivery drop-off area 140 during synchronized customer retrieval of delivered packages in low-light conditions.

Delivery drop-off area 140 represents an area in which package "drop-off" physically occurs. Delivery drop-off area 140 depicts an area surrounding a likely target drop-off point for package delivery, and one or more pathways leading to the point at which a package is dropped off. In some embodiments, delivery drop-off area 140 is segmented into sections used to more precisely indicate the location of detected hazards, which can be illustrated on a display of user interface 125 of a hazard map on customer computing device 120. Segmentation of delivery drop-off area 140 assists in performing mitigation actions of detected hazards, such as the deployment of traction improving materials.

Segments 160a, 160b, and 160c represent segments of delivery drop-off area 140 in which hazardous condition 170 has been detected. Segments 160a, 160b, and 160c enable additional precision in indicating the location of hazards within delivery drop-off area 140. Hazardous condition 170 includes detected slippery conditions that may result in customer falls, such as black ice, ice, snow, or standing water. Hazardous conditions 170 may also include obstacles, obstructions, or other surface anomalies in a pathway the customer may likely traverse to retrieve the delivered package in delivery drop-off area 140. For example, obstacles and obstructions may be tools, toys, bicycles, and fallen branches, whereas surface anomalies may include holes, and loosened stones or pathway surface materials. In some embodiments, hazardous condition 170 may include poor lighting conditions, requiring illumination assistance from drone 130 or summoned auxiliary drones.

Figure 2:
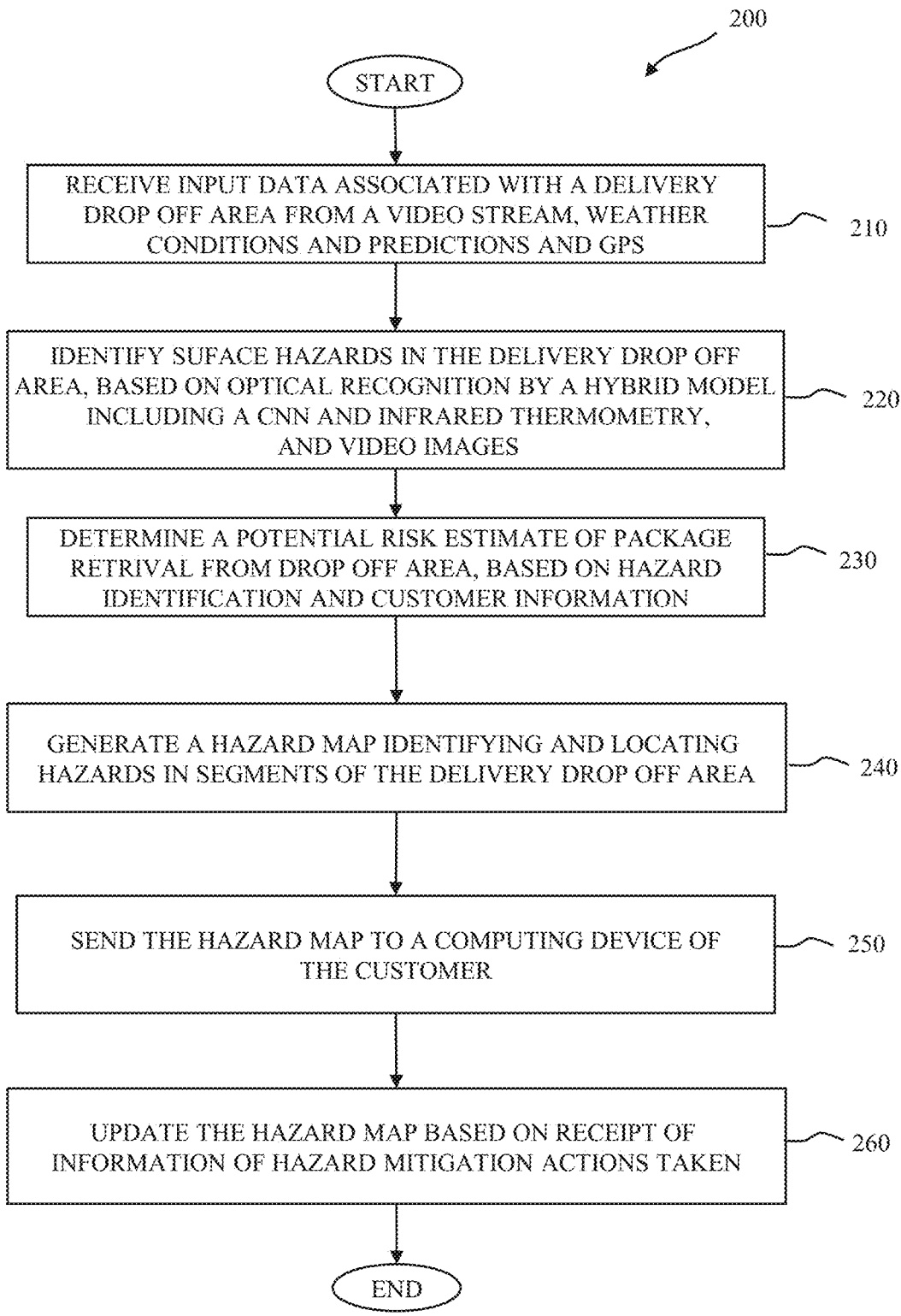
FIG. 2 is a flowchart depicting the operational steps of a hazard map program, in accordance with embodiments of the present invention.

FIG. 2 is a flowchart depicting operational steps of hazard map program 200, in accordance with embodiments of the present invention. Hazard map program 200 identifies hazards in the delivery drop-off area, determines a level of risk in the retrieval of a delivered package and, based on the level of risk, generates a hazard map that is sent to
    a computing device of the customer. Hazard map program 200 provides detected hazard data to hazard mitigation program 300 and receives mitigation action updates from hazard mitigation program 300.

Hazard map program 200 receives input data associated with the delivery drop-off area from a stream of video images, current weather conditions, predicted weather conditions, and global positioning system data (step 210). Hazard map program 200 receives video images from a camera included in the delivery vehicle, along with input from additional sensors and devices, such as temperature readings and GPS position. Additionally, hazard map program 200 receives current weather and predicted weather conditions associated with the delivery drop-off area. In some embodiments, hazard map program 200 receives information from the customer profile associated with the recipient of the package for delivery. The customer profile information availability depends upon receiving permission consent by the customer. The customer profile information may include physical condition and health condition associated with the customer, as well as updates indicating availability of the customer.

For example, hazard map program 200 receives input data of current and predicted weather conditions by connecting with online weather forecasting sources. Hazard map program 200 receives video images of the surface of the delivery drop-off area from camera 135 of drone 130 and may receive additional data from sensors and GPS capability installed on drone 130 (not shown). Hazard map program 200 accesses customer profile information based on confirmation of consent by the customer. In some embodiments, hazard map program 200 determines delivery drop-off area, based on previously determined information from prior deliveries or from direct input by the customer interacting with the delivery service provider. In other embodiments, hazard map program 200 determines the delivery drop-off area by identifying an accessible area that includes a pathway from the home or building entry of the customer.

Hazard map program 200 identifies surface hazards in the delivery drop-off area, based on hybrid models (step 220). Hazard map program 200 identifies hazards on the surface of the delivery drop-off area, such as ice, snow, wet surfaces, standing water, obstructions, obstacles, and surface anomalies. Obstructions include objects blocking or partially blocking the path a customer would take to retrieve a package delivered in the delivery drop-off area. Obstacles may not block a pathway, but may pose tripping hazards, such as toys, tools, or other objects left in the delivery drop-off area or pathway to the drop-off area. Surface anomalies include damage to hard surface pathways, such as loose pavers or stones, and include roots, holes, and other surface conditions that may pose tripping or fall-causing hazards.

Hazard map program 200 identifies hazards based on hybrid machine learning (ML) models that include object recognition from video images of the delivery drop-off area and a convolutional neural network using infrared thermometry. The hybrid model can identify objects and surface anomalies by object recognition and distinguish ice, black ice, snow, and water on surfaces by measuring radiance at specific spectral bands using photodetectors and thermophiles, included in the delivery vehicle configuration, to make radiance measurements. The spectral band radiance measurement data is used to train the models to distinguish between ice, snow, wet surfaces, and standing water in the delivery drop-off area. Hazard map program 200 identifies the type of hazard and determines the position of detected hazards within the delivery drop-off area, based on virtual segmenting of the drop-off area, such that the location of each hazard within the delivery drop-off area corresponds to a segment of the drop-off area.

Hazard map program 200 determines a potential risk estimate of package retrieval from the drop-off area (step 230). Identified hazards and respective locations of hazards are assessed by hazard map program 200 to determine the potential risk of retrieval of the delivered package. Hazard map program 200 determines the most direct and likely pathway the customer would take to retrieve the delivered package and compares the pathway to the quantity, type, and location of the detected hazards. Hazard map program 200 determines an estimated level of risk of injury to the customer based on a proximity of hazards to the likely customer pathway, the type and extent of the hazard, and known physical and health condition of the customer based on consented access to customer profile information. For example, but not by limitation, hazard map program 200 receives training data and maintains a running tally of drop-off site conditions and situations that are deemed detrimental to a successful customer retrieval of a package from a drop-off location. Each instance of training data and subsequent drop-off instances included in the running tally receives a risk rating, such as a low, medium, or high risk. Each rating and instance can include different levels of immediate action that can be taken at the delivery drop-off area. In some embodiments, combinations of low, medium, or low and medium conditions may result in an elevated risk level.

For instance, if the path(s) between the point of package drop-off and the entrance to the customer home or building is detected as having slippery conditions, then traction enhancing actions would be taken without regard to any customer's personal data details. The risk level would be determined as medium or high based on the quantity and percent coverage of segment sections that include the slippery area conditions with respect to the paths to the point of package drop-off. However, if clear paths can be found but require a longer route for the customer, then customer personal data details, such as advanced age, physical condition, disability, and other health conditions, may be accessed to determine a level of risk. The number and degree of personal data details of the customer, given the clear but longer alternate path, is used to determine low, medium, and high level of risk. In some embodiments, hazard map program 200 shares the longer clear path and drop-off point with the customer via a computing device of the customer. A combination of some detected surfaces with ice or snow on paths to the drop-off point combined with personal data details that increase the risk of injury would result in the delivery vehicle immediately applying traction enhancing actions and contacting the customer with the hazard map and alerts. Should the customer personal data details indicate no physical or health limitations (or if no personal data is available), hazard map program 200 shares the delivery site location and detected condition data with the customer who then can request either a different drop-off location or drop-off time (i.e., next day), hazard remediation actions, or accept the planned delivery.

For example, hazard map program 200 identifies objects left within the delivery drop-off area and a loose stone on the pathway the customer will likely take to the delivery drop-off point, based on the object recognition model of data input by drone 130 using camera 135. Additionally, hazard map program 200, using the CNN model determines ice is covering two segments of delivery drop-off area 140 that align with the likely pathway the customer would take to retrieve the package. Hazard map program 200 determines from the customer profile that the customer's age and physical condition are conducive to a serious injury if the customer were to fall. Hazard map program 200 determines the estimated risk level as high, based on the combination of detected hazard type, position, and customer profile information.

Hazard map program 200 generates a hazard map identifying and locating hazards in segments of the delivery drop-off area (step 240). Hazard map program 200 generates a digitized hazard map of the delivery drop-off area and includes additional areas near the delivery drop-off area. The digitized hazard map is displayable in a user interface display of a computing device of the customer. Hazard map program 200 identifies the hazard types and locations within virtual segments on the map of the delivery drop-off area. The addition of areas near the delivery drop-off area enables possible identification of an alternate drop-off area by interactive features of the hazard map (discussed further below).

For example, hazard map program 200 generates a map of delivery drop-off area 140 and includes virtual segments overlaying the drop-off area, such as segments 160a, 160b, and 160c as well as the remaining segments of delivery drop-off area 140. Additionally, hazard map program 200 includes in the map display some areas near the delivery drop-off area. Hazard map program 200 identifies the detected hazard type and position of respective hazards, such as hazardous condition 170 within the segments of delivery drop-off area 140.

Hazard map program 200 sends the hazard map to a computing device of the customer (step 250). Having generated the hazard map indicating the type and location of hazards within the delivery drop-off area, hazard map program 200 sends the hazard map to a computing device of the customer for display. In some embodiments, the customer's computing device includes an application configured to receive hazard maps, alerts, and delivery notifications associated with the delivery service and may enable connection to the respective delivery vehicle. In other embodiments, a link to a website that includes the particular hazard map for the customer's package delivery is sent to the customer via short message service, email, or notification, and the link provides online access to the hazard map displayed in a browser.

In some embodiments, hazard map program 200 provides access to the hazard map to a remote virtual delivery assistant that can provide interactive communication to assist the customer as needed. In some embodiments, a service that can be "opted-in" by the customer includes the remote virtual delivery assistant, which can be a human that provides guidance to the delivery vehicle and remotely observes and inspects the delivery drop-off area, especially for cases in which the accuracy of the delivery drop-off area is low or the detected conditions are unclear. In other embodiments, the remote virtual delivery assistant can be an artificial intelligence (AI) agent that provides similar services. The remote virtual delivery assistant may contact the customer to communicate some of the hazards detected with respect to retrieving the delivered package.

In some embodiments of the present invention, the hazard map provided to the customer is an interactive map and enables the customer to navigate on the map to indicate a preferred alternate drop-off area for package delivery, due to the indicated hazards on the hazard map. In some embodiments, the alternative drop-off area is determined and confirmed by hazard map program 200 and a new delivery drop-off area is determined, segmented, and assessed for hazards. Hazard map program 200 may regenerate the hazard map based on the alternate delivery drop-off area indicated by the customer's interaction with the prior hazard map and based on detection of hazards and estimated risk level, hazard map program 200 may send the new hazard map to the computing device of the customer.

Hazard map program 200 updates the hazard map based on received information of hazard mitigation actions taken (step 260). Hazard map program 200 receives updated information from hazard mitigation program 300 that includes the mitigation actions taken and indicates the specific hazard to which the mitigation action was directed, based on identifying the type of detected hazard and the location of the hazard within the virtual segments of the delivery drop-off area. Hazard map program 200 updates the hazard map by indicating mitigation actions taken for the hazards identified in an update received from hazard mitigation program 300. In some embodiments, hazard map program 200 sends the updated hazard map to the computing device of the customer.

Having delivered the package to the delivery drop-off area (i.e., original drop-off area or customer indicated alternative) and having delivered an updated hazard map to the computing device of the customer, hazard map program 200 ends.

Figure 3:
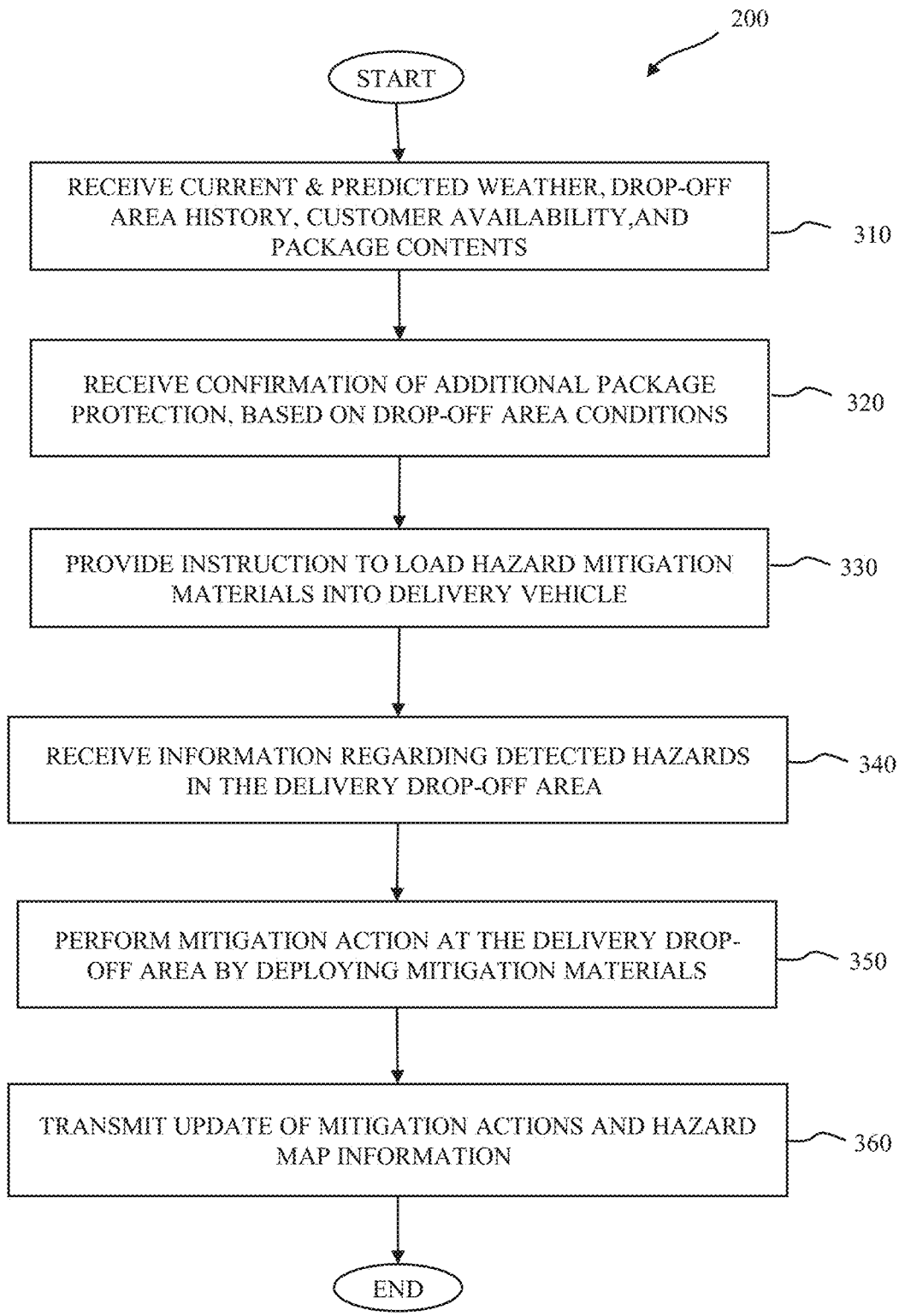
FIG. 3 is a flowchart depicting the operational steps of a hazard mitigation program, operating in the distributed data processing environment of FIG. 1, in accordance with embodiments of the present invention.

FIG. 3 is a flowchart depicting operational steps of hazard mitigation program 300, operating in the distributed data processing environment of FIG. 1, in accordance with embodiments of the present invention. Hazard mitigation program 300 receives information that includes current and predicted weather, delivery drop-off area history, customer availability, and package contents (step 310). Hazard mitigation program 300 receives information associated with the location of the delivery drop-off area that includes the current and predicted weather conditions, the history associated with deliveries to the drop-off area, the availability of the customer, the time of day, and information regarding the contents of the package to be delivered. Hazard mitigation program 300 uses the input of information to determine whether additional packaging preparation is recommended to protect the package contents. Hazard mitigation program 300 receives available information prior to departure for delivery, offering an opportunity to provide additional protections for the delivery of the package.

For example, hazard mitigation program 300 receives current weather information for the delivery drop-off area that indicates heavy rain conditions. The predicted weather information received indicates the rain conditions will continue well past the estimated time of delivery, and the available customer information indicates the customer won't be available to retrieve the delivered package for several hours. Additionally, the history information associated with the delivery drop-off area indicates significant standing water occurs during heavy rains at the delivery drop-off area.

Hazard mitigation program 300 receives confirmation of additional package protection, based on delivery drop-off area weather conditions (step 320). In some embodiments, hazard mitigation program 300 provides instruction for additional packaging considerations based on the received input information associated with the package contents and the conditions and history associated with the delivery drop-off area, prior to departure for delivery of the package. For example, having determined weather conditions at the location of delivery drop-off area 140, hazard mitigation program 300 provides instruction to include a deployable covering for the package to be included in payload 137, and hazard mitigation program 300 deploys the covering, such as a tarp, to cover the package placed in the delivery drop-off area. In some embodiments, hazard mitigation program 300 receives confirmation of completion of the additional packaging protections.

As an additional example, prior to delivery departure, hazard mitigation program 300 provides instruction for additional packaging materials to protect the contents of the package from water penetration and moisture, based on the current and predicted weather conditions received that indicate heavy rain conditions continuing for hours after estimated delivery time, and the lack of availability of the customer to promptly retrieve the delivered package. Subsequent to providing additional protective materials to the package, a user indicates completion of the package preparation, and the confirmation is received by hazard mitigation program 300.

Hazard mitigation program 300 provides instruction to load hazard mitigation materials into the delivery vehicle (step 330). Hazard mitigation program 300 provides instruction for the loading of hazard mitigation materials into the delivery vehicle which, when completed, includes a confirmation to hazard mitigation program 300. The hazard mitigation materials, for example, may include traction improvement materials, such as ice-melting material and sand, markers that are highly visible and are deployed to indicate the position of hazards, and glow-in-the-dark items that can mark hazards in low light conditions. In some embodiments, the amount of mitigation materials loaded into the delivery vehicle may depend on limitations of the vehicle and the size and history associated with the delivery drop-off area for the particular package delivery.

For example, hazard mitigation program 300 provides instructions to include an estimated quantity of ice-melting material and a half dozen high visibility markers into a predetermined section of payload 137 of drone 130. Hazard mitigation program 300 determines the hazard mitigation materials and quantities based on the current and predicted weather conditions and history information associated with delivery drop-off area 140. Hazard mitigation program 300 determines that recent snow in delivery drop-off area 140 partially melted and will have re-frozen by the estimated delivery time, and the delivery drop-off area often includes loose paver stones in the walkway leading to the package delivery point and should be marked for clear identification.

Hazard mitigation program 300 receives input of detected hazards in the delivery drop-off area (step 340). In some embodiments, hazard mitigation program 300 receives the information regarding detection of hazards in the delivery drop-off area determined by hazard map program 200 while examining and analyzing the data associated with delivery drop-off area 140. The hazard detection information received includes the identification of a type of hazard and the location of the hazard within the delivery drop-off area, based on the virtually assigned segments of the drop-off area. Hazard mitigation program 300 determines whether the detected hazards, current conditions at the delivery drop-off area, and customer information require the performance of a hazard mitigation action.

For example, hazard mitigation program 300 receives information regarding hazards detected at delivery drop-off area 140, based on assessment by the machine learning model of hazard map program 200 utilizing a convolutional neural network and use of infrared thermometry, and optical recognition of images of delivery drop-off area 140 from camera 135 of drone 130. From the received information, hazard mitigation program 300 determines the type of hazard, such as slippery conditions, poorly lit area, obstructions, or surface anomalies that may be trip hazards. Hazard mitigation program 300 determines whether mitigation actions are recommended based on the hazard risk level received from hazard map program 200, the type of hazard, the size or number of hazards, and the position of detected hazards within the segments of delivery drop-off area 140.

Hazard mitigation program 300 performs a mitigation action at the delivery drop-off area, based on the detected hazard input received (step 350). Having determined that the level of risk presented by the detected hazard warrants mitigation actions, hazard mitigation program 300 performs a mitigation action at the delivery drop-off area, reducing the risk to the customer or users retrieving the delivered package. In some embodiments, the mitigation action includes deploying a traction improving material, such as ice-melt material (e.g., salt) or sand. For hazard conditions that include a poorly lit drop-off area, hazard mitigation program 300 initiates illumination of the delivery drop-off area. In some embodiments, hazard mitigation program 300 deploys markers that include high-visibility features to clearly identify detected obstructions, obstacles, or surface anomalies in the delivery drop-off area, enabling the customer retrieving a delivered package to avoid tripping hazards. In some embodiments, hazard mitigation program 300 determines that additional mitigation materials are needed beyond the quantity included in the delivery vehicle. Requirement for the additional materials may depend on the extent of the area covered by the hazard, the number of hazards, or an estimate of the severity of the hazard as determined by the ML model that utilizes a convolutional neural network and trained by combinations of optical detection, infrared thermometry, and weather condition data, and the number of segments of the delivery drop-off area covered by one or more hazards.

In some embodiments, hazard mitigation program 300 contacts a secondary delivery vehicle that includes additional mitigating materials and directs the secondary delivery vehicle to the delivery drop-off area to deploy the additional material. The secondary delivery vehicle may be part of a fleet of on-demand delivery vehicles to provide hazard mitigation services. In yet other embodiments, hazard mitigation program 300 may perform a mitigation action that includes improving traction conditions within the delivery drop-off area by activating thermal coils configured into the delivery vehicle, and melts detected ice or snow that poses a slipping hazard For example, drone 130 receives hazard detection information from hazard map program 200 identifying ice hazards within more than half of the segments of delivery drop-off area 140. In addition, a hole is detected within segment 160a of the delivery drop-off area that the customer would most likely travel to retrieve the package. Hazard mitigation program 300 deploys ice-melting material from a section of payload 137 of drone 130 on to the segments in which ice has been detected and deploys markers from an additional section of payload 137 of drone 130, having high-visibility properties, adjacent to a hole detected as a surface anomaly of delivery drop-off area 140. Hazard mitigation program 300 determines that the area covered by the ice hazard requires additional ice-melting material beyond the amount deployed and contacts an on-demand delivery service to dispatch a secondary delivery vehicle drone with additional ice-melting material to the delivery drop-off area location. In some embodiments, the delivery service may deploy a delivery vehicle to retrieve the hazard markers used to highlight obstruction and trip hazards to customers subsequent to hazard map program 200 receiving input indicating package retrieval as complete.

Hazard mitigation program 300 transmits an update of mitigation and hazard map information (step 360). Hazard mitigation program 300 completes mitigation actions and generates an update message received by hazard map program 200 to update the hazard map indicating the mitigation actions taken against hazards identified on the hazard map, and the time at which the actions were taken. Hazard mitigation program 300 assesses the mitigation actions taken and determines whether hazard risks may be reduced. Hazard mitigation program 300 determines potential reduction of hazard risks by determining whether the mitigation actions were delivered on target, whether there are indications the mitigation materials are preforming as expected, and whether the mitigation actions provide a safer pathway for the customer to retrieve the delivered package (i.e., melting of snow and ice). In some embodiments, the hazard map information is updated and transmitted to the computing device of the customer. In some embodiments hazard mitigation program 300 transmits an alert to the computing device of the customer confirming the mitigation actions taken to reduce the hazard risks to the customer during retrieval of the package.

For example, hazard mitigation program 300 completes deployment of traction improving materials on the slipping hazards detected in delivery drop-off-area 140 and confirms the materials were deployed directly on the hazards, as confirmed by video images from camera 135 of drone 130. Additional material deployed by a secondary delivery vehicle called by hazard mitigation program 300 is also confirmed to be deployed on target to ice conditions detected. In addition, several markers are confirmed by video image to be adjacent to the hole detected as a surface anomaly within delivery drop-off area 140. Hazard mitigation program 300 updates the hazard information and transmits the update to hazard map program 200 to update the hazard map, and in some embodiments, hazard mitigation program 300 provides an update alert to the computing device of the customer that includes indicating the hazards receiving mitigation actions, and in some embodiments, indicates the actions taken.

Having performed mitigation actions and providing an update of hazards detected in the delivery drop-off area to update the hazard map and alert the customer's computing device, hazard mitigation program 300 and hazard map program 200 end.

Figure 4:
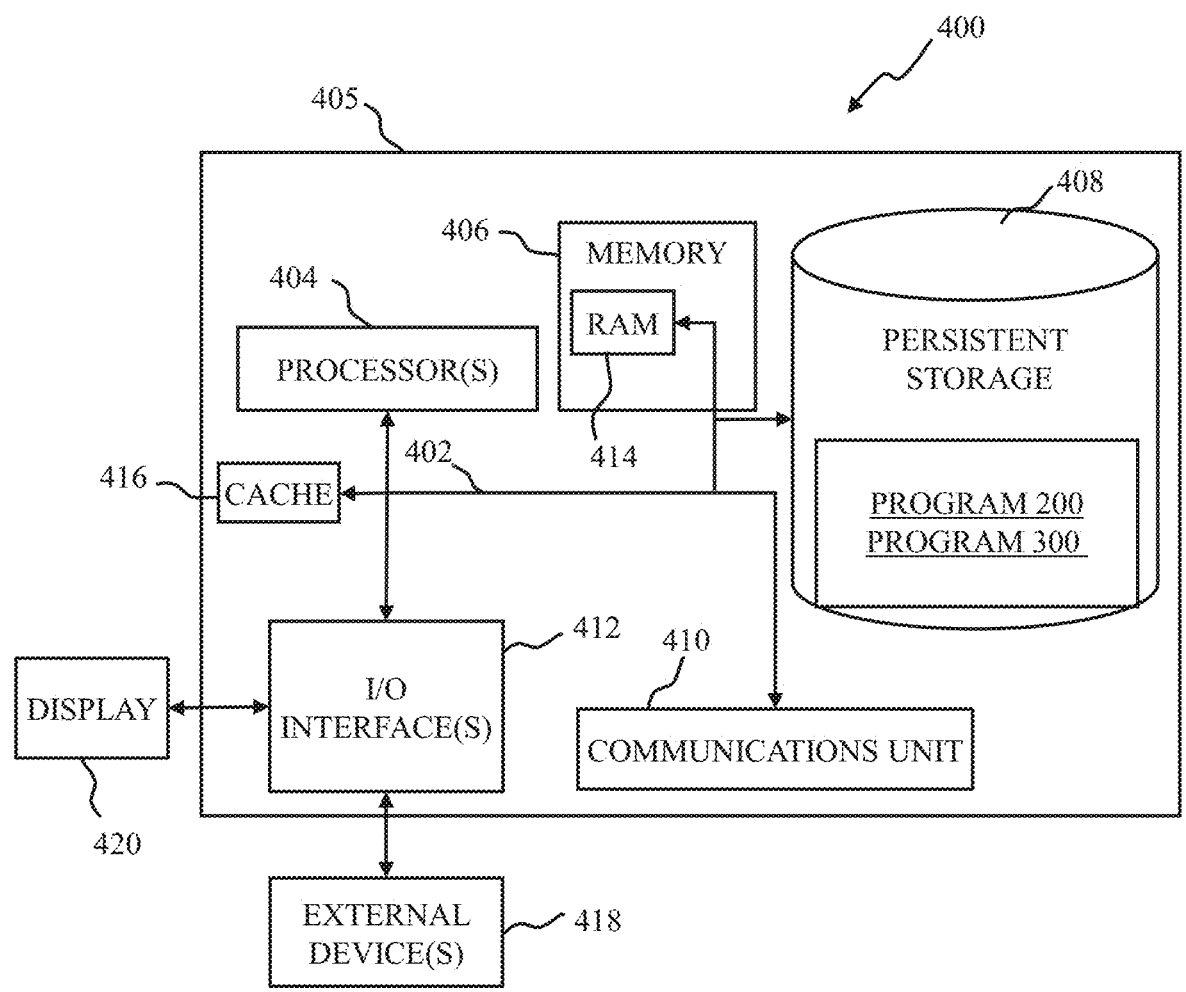
FIG. 4 depicts a block diagram of components of a computing system, including a computing device configured to operationally perform the hazard map program of FIG. 2 and the hazard mitigation program of FIG. 3, in accordance with an embodiment of the present invention.

FIG. 4 depicts a block diagram of components of a computing system, including computing device 405, configured to include or operationally connect to components depicted in FIG. 1, and with the capability to operationally perform hazard map program 200 of FIG. 2 and hazard mitigation program 300 of FIG. 3, in accordance with an embodiment of the present invention.

Computing device 405 includes components and functional capability similar to components of computing device 110 and customer computing device 120, (FIG. 1), in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, an input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406, cache memory 416, and persistent storage 408 are computer-readable storage media. In this embodiment, memory 406 includes random access memory (RAM) 414. In general, memory 406 can include any suitable volatile or non-volatile computer-readable storage media.

In one embodiment, hazard map program 200 and hazard mitigation program 300 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Hazard map program 200 and hazard mitigation program 300 may be downloaded to persistent storage 308 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., hazard map program 200 and hazard mitigation program 300 can be stored on such portable computer-readable storage media and can be loaded onto persistent storage 408 via I/O interface(s) 412. I/O interface(s) 412 also connects to a display 420.

Display 420 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for mitigation of hazardous conditions in a drop-off area for delivery of a package by a delivery vehicle, the method comprising:
   detecting conditions of a surface of the delivery drop-off area based on images and sensor data received from the delivery vehicle;
   determining a hazardous condition for customer retrieval of a delivered package in the delivery drop-off area based on the images and the sensor data received from the delivery vehicle;
   performing at least one action to mitigate the hazardous condition determined to exist at the delivery drop-off area, wherein the at least one mitigating action includes providing access and directional control of the delivery vehicle to the customer in response to the delivery vehicle being located within a predetermined distance of the delivery drop-off area by transmitting a hazard map to the computing device of the customer, the hazard map including an interactive feature enabling the customer to cause the delivery vehicle to deliver the package to an alternative drop-off point; and delivering, by the delivery vehicle, the package to the alternative drop-off point.

2. The method of claim 1, further comprising:

detecting a slipping hazardous condition on the surface of the delivery drop-off area; and deploying, by the delivery vehicle, a traction improvement material, included in the delivery vehicle, on the delivery drop-off area associated with the slipping hazard condition.

3. The method of claim 2, wherein the traction improvement material is selected from a group consisting of ice-melting material and sand.

4. The method of claim 1, wherein the hazardous condition is determined to be black ice, and the at least one action performed to mitigate the hazard condition includes deploying a salt material.

5. The method of claim 1, wherein the at least one action to mitigate the hazardous condition include activating thermal coils on the delivery vehicle to melt frozen water detected in the delivery drop-off area.

6. The method of claim 1, wherein a second delivery vehicle is summoned to the delivery drop-off area to provide additional actions to mitigate the hazardous condition.

7. The method of claim 1, further comprising:

determining, prior to delivery departure, additional package protections based on current and predicted weather conditions, delivery drop-off area history, package contents, and customer availability.

8. The method of claim 1, wherein the at least one action to mitigate the hazardous condition determined to exist at the delivery drop-off area includes providing illumination of the delivery drop-off area during low light conditions.

9. A computer system for mitigation of hazardous conditions in a drop-off area for delivery of a package by a delivery vehicle, the computer system comprising:

one or more computer processors;

one or more computer readable storage media and program instructions stored on the one or more computer readable storage media, the program instructions comprising:

program instructions to detect conditions of a surface of the delivery drop-off area based on images and sensor data received from the delivery vehicle;

program instructions to determine a hazardous condition for customer retrieval of a delivered package in the delivery drop-off area based on the images and the sensor data received from the delivery vehicle;

program instructions to perform at least one action to mitigate the hazardous condition determined to exist at the delivery drop-off area, wherein the at least one mitigating action includes providing access and directional control of the delivery vehicle to the customer in response to the delivery vehicle being located within a pre-determined distance of the delivery drop-off area by transmitting a hazard map to the computing device of the customer, the hazard map including an interactive feature enabling the customer to cause the delivery vehicle to deliver the package to an alternative drop-off point; and program instructions provided to the delivery vehicle to deliver the package to the alternative drop-off point.

10. The computer system of claim 9, further comprising program instructions to:

detect a slipping hazardous condition on the surface of the delivery drop-off area; and instruct the delivery device to deploy a traction improvement material, included in the delivery vehicle, on the delivery drop-off area associated with the slipping hazard condition, wherein the traction improvement material includes ice-melting material and sand.

11. The computer system of claim 9, wherein the hazardous condition is determined to be black ice, and the at least one action performed to mitigate the hazard condition includes deploying an ice-melting material.

12. The computer system of claim 9, wherein the at least one mitigating action further includes a selection from the group consisting of summoning a second delivery vehicle to the delivery drop-off area to provide additional mitigation materials and providing illumination of the delivery drop-off area during low light conditions.

13. A computer program product for mitigation of hazardous conditions in a drop-off area for delivery of a package by a delivery vehicle, the computer program product comprising:

one or more computer readable storage media and program instructions stored on the one or more computer readable storage media, the program instructions comprising:

program instructions to detect conditions of a surface of the delivery drop-off area based on images and sensor data received from the delivery vehicle;

program instructions to determine a hazardous condition for customer retrieval of a delivered package in the delivery drop-off area based on the images and the sensor data received from the delivery vehicle;

program instructions to perform at least one action to mitigate the hazardous condition determined to exist at the delivery drop-off area, wherein the at least one mitigating action includes providing access and directional control of the delivery vehicle to the customer in response to the delivery vehicle being located within a pre-determined distance of the delivery drop-off area by transmitting a hazard map to the computing device of the customer, the hazard map including an interactive feature enabling the customer to cause the delivery vehicle to deliver the package to an alternative drop-off point; and program instructions provided to the delivery vehicle to deliver the package to the alternative drop-off point.

14. The computer program product of claim 13, further comprising program instructions to:

detect a slipping hazardous condition on the surface of the delivery drop-off area; and instruct the delivery device to deploy a traction improvement material, included in the delivery vehicle, on the delivery drop-off area associated with the slipping hazard condition, wherein the traction improvement material is selected as one or a combination from the group including ice-melting material and sand.

15. The computer program product of claim 13, wherein the at least one action to mitigate the hazardous condition includes activating thermal coils on the delivery vehicle to melt frozen water detected in the delivery drop-off area.

16. The computer program product of claim 13, wherein the hazardous condition is determined to be black ice, and the at least one action performed to mitigate the hazard condition includes deploying an ice-melting material.

* * * * *